United States Patent
Mori et al.

(10) Patent No.: US 12,145,105 B2
(45) Date of Patent: Nov. 19, 2024

(54) FILTRATION APPARATUS AND OPERATION METHOD THEREFOR

(71) Applicant: Toray Industries, Inc., Tokyo (JP)

(72) Inventors: Ayumi Mori, Otsu (JP); Atsushi Kobayashi, Otsu (JP); Kentaro Kobayashi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 310 days.

(21) Appl. No.: 17/417,517

(22) PCT Filed: Dec. 25, 2019

(86) PCT No.: PCT/JP2019/050998
§ 371 (c)(1),
(2) Date: Jun. 23, 2021

(87) PCT Pub. No.: WO2020/138231
PCT Pub. Date: Jul. 2, 2020

(65) Prior Publication Data
US 2022/0111335 A1  Apr. 14, 2022

(30) Foreign Application Priority Data

Dec. 26, 2018 (JP) .................................. 2018-242780

(51) Int. Cl.
*B01D 61/22* (2006.01)
*B01D 65/02* (2006.01)

(52) U.S. Cl.
CPC .............. *B01D 61/22* (2013.01); *B01D 65/02* (2013.01); *B01D 2311/165* (2013.01); *B01D 2321/04* (2013.01)

(58) Field of Classification Search
CPC .. B01D 61/22; B01D 65/02; B01D 2311/165; B01D 2321/04; C02F 2209/03; C02F 2209/40; C02F 2303/16; C02F 1/444
See application file for complete search history.

(56) References Cited

U.S. PATENT DOCUMENTS

| | | |
|---|---|---|
| 2011/0035195 A1 | 2/2011 | Subbiah et al. |
| 2011/0290723 A1 | 12/2011 | Bonnelye et al. |
| 2012/0024794 A1* | 2/2012 | Fischmann ............ B01D 21/30 |
| | | 210/709 |

FOREIGN PATENT DOCUMENTS

| | | | |
|---|---|---|---|
| CN | 104609533 A * | 5/2015 | ............. C02F 1/008 |
| CN | 206027462 U | 3/2017 | |

(Continued)

OTHER PUBLICATIONS

Miller, Comparison Of Membrane Fouling At Constant Flux And Constant Transmembrane Pressure Conditions, Journal of Membrane Science 454 (2014) 505-515 (Year: 2013).*

(Continued)

*Primary Examiner* — Hayden Brewster
(74) *Attorney, Agent, or Firm* — Buchanan Ingersoll & Rooney PC

(57) ABSTRACT

The present invention relates to a filtration device including: a flow rate control unit; a separation membrane module; a liquid flow rate detection unit detecting a liquid flow rate at a freely-selected part; and an external control unit controlling a state of the flow rate control unit, in which the external control unit includes: a target range setting step of setting a target flow rate range A; a control state recording step of recording a state S of the flow rate control unit when the liquid flow rate at the freely-selected part first enters within the target flow rate range A; a state setting step of setting the flow rate control unit to the state S; and a flow rate controlling step of controlling the liquid flow rate to be within the target flow rate range A.

10 Claims, 3 Drawing Sheets

(56) References Cited

FOREIGN PATENT DOCUMENTS

| EP | 3427807 | A1 | | 1/2019 |
|----|---------|----|----|--------|
| JP | 61236068 | A | | 10/1986 |
| JP | 06277664 | A | | 10/1994 |
| JP | 2004008934 | A | * | 1/2004 |
| JP | 2005013797 | A | | 1/2005 |
| JP | 2005137978 | A | | 6/2005 |
| JP | 2007245061 | A | | 9/2007 |
| JP | 2008188540 | A | | 8/2008 |
| JP | 2008188541 | A | | 8/2008 |
| JP | 2012200613 | A | | 10/2012 |
| JP | 2016022446 | A | | 2/2016 |
| WO | 2009104035 | A1 | | 8/2009 |

OTHER PUBLICATIONS

Fujisaki, JP2007245061 A, English machine translation (Year: 2007).*
Li, CN104609533 A, English machine translation (Year: 2015).*
Koichi, JP2004008934 A, English machine translation (Year: 2004).*
International Search Report and Written Opinion for International Application No. PCT/JP2019/050998, dated Oct. 3, 2020, 6 pages.
Indian Examination Report for Indian Application No. 202147028594, dated Aug. 2, 2022, with translation, 5 pages.
Chinese Office Action for Chinese Application No. 201980086196.1, issued Feb. 27, 2023 with translation, 18 pages.
Extended European Search Report for European Application No. 19 904 397.7, dated Jul. 15, 2022, 8 pages.
Chinese Office Action for Chinese Application No. 201980086196.1, dated Jul. 5, 2022, with translation, 20 pages.
Japanese Notification of Reasons for Refusal for Japanese Application No. 2020-502507, dated Jul. 11, 2023 with translation, 12 pages.
European Communication Pursuant to Article 94(3) for European Application No. 19904397.7, dated Jun. 28, 2023, 5 pages.

* cited by examiner

FILTRATION APPARATUS AND OPERATION METHOD THEREFOR

CROSS REFERENCE TO RELATED APPLICATIONS

This is the U.S. National Phase application of PCT/JP2019/050998, filed Dec. 25, 2019, which claims priority to Japanese Patent Application No. 2018-242780, filed Dec. 26, 2018, the disclosures of these applications being incorporated herein by reference in their entireties for all purposes.

FIELD OF THE INVENTION

The present invention relates to a filtration device and an operating method thereof.

BACKGROUND OF THE INVENTION

Filtration using a separation membrane is used in various fields, for example, water treatment fields such as drinking water production, water purification treatment, and wastewater treatment, fermentation fields involving culturing of microorganisms and cultured cells, and food industry fields.

As a filtration operation of using the separation membrane to filter a liquid to be filtered is continued, it is inevitable that deposits accumulate on a surface of the separation membrane so that filtration performance of the separation membrane is deteriorated. Therefore, as one method of removing the deposits on the surface of the separation membrane after the filtration operation is continued for a certain period of time, a backflow washing operation in which a backwash liquid is caused to flow back to the separation membrane is provided. By alternately performing the filtration operation and the backflow washing operation, it is possible to periodically remove the deposits on the surface of the separation membrane so as to maintain the filtration performance of the separation membrane.

However, since a state of the separation membrane or the like is not always constant when such a filtration operation or such a backflow washing operation is started, it takes a long time to stabilize a flow rate of the liquid within a target range after the liquid to be filtered or the backwash liquid is started to be supplied to the separation membrane, which has been problematized.

In this regard, as a technique for early stabilizing the liquid flow rate after the operation is started, a method of reproducing a state of a control device when a liquid flow rate was stabilized during a previous operation for a predetermined time at the start of a next operation (Patent Literature 1), a method of performing preliminary control to set a state immediately before an end of a previous control operation to be a target state before the start of a next control operation (Patent Literature 2), and the like are disclosed.

PATENT LITERATURE

Patent Literature 1: JP-A-2005-13797
Patent Literature 2: JP-A-S61-236068

SUMMARY OF THE INVENTION

However, the conventional methods for early stabilization of the liquid flow rate cannot exhibit a sufficient effect or cannot be flexibly applied when, for example, a filtration operation and a backflow washing operation, whose target flow rates are significantly different from each other, are continuously performed. Moreover, in the conventional methods, there has been a problem that membrane fouling is likely to proceed as the liquid flow rate immediately after the start of the operation is significantly higher than the target flow rate.

Therefore, an object of the present invention is to provide a filtration device and an operating method thereof, which are not easily affected even when there is a large difference between the target flow rates, and can early stabilize the liquid flow rate after the start of the operation while preventing the liquid flow rate immediately after the start of operation from becoming significantly higher than the target flow rate.

In order to solve the above problems, the present invention provides the following filtration device and an operating method thereof.

(1) A filtration device including:
a flow rate control unit;
a separation membrane module;
a liquid flow rate detection unit detecting a liquid flow rate at a freely-selected part; and
an external control unit controlling a state of the flow rate control unit,
in which the external control unit includes:
a target range setting step of setting a target flow rate range A which includes a target liquid flow rate at the freely-selected part;
a control state recording step of recording a state S of the flow rate control unit when the liquid flow rate at the freely-selected part first enters within the target flow rate range A after a liquid to be filtered or a backwash liquid is started to be supplied to the separation membrane module;
a state setting step of setting the flow rate control unit to the state S recorded in the control state recording step; and
a flow rate controlling step of controlling the liquid flow rate to be within the target flow rate range.

(2) The filtration device according to (1), in which the target flow rate range A is within ±10% with respect to the target liquid flow rate.

(3) The filtration device according to (1) or (2), in which the flow rate control unit is a valve and/or a pump.

(4) A method of operating a filtration device, the filtration device including a flow rate control unit and a separation membrane module,
the method including:
a target range setting step of setting a target flow rate range A which includes a target liquid flow rate at a freely-selected part;
a control state recording step of recording a state S of the flow rate control unit when a liquid flow rate at the freely-selected part first enters within the target flow rate range A after a liquid to be filtered or a backwash liquid is started to be supplied to the separation membrane module;
a liquid passing step I of setting the flow rate control unit to the state S recorded in the control state recording step, and supplying the liquid to be filtered or the backwash liquid to the separation membrane module; and
a liquid passing step P of controlling a flow rate, at which the liquid to be filtered or the backwash liquid is supplied to the separation membrane module, to be within the target flow rate range by the flow rate control unit.

(5) The method of operating a filtration device according to (4), in which the supply of the liquid to be filtered or the backwash liquid is stopped after the control state recording step is finished, and the supply of the liquid to be filtered or the backwash liquid is started in the liquid passing step I.

(6) The method of operating a filtration device according to (4) or (5), in which the liquid passing step I is continued for 5 seconds or more.

(7) The method of operating a filtration device according to any one of (4) to (6), in which the target flow rate range A is within ±10% with respect to the target liquid flow rate.

(8) The method of operating a filtration device according to any one of (4) to (7), in which the flow rate control unit is a valve and/or a pump.

According to the filtration device and the operating method thereof of the present invention, even in a case where the filtration operation and the backflow washing operation, whose target flow rates are largely different from each other, are continuously performed, the time until the liquid flow rate is stabilized from starting the operation can be significantly shortened without being affected therefrom. Further, the flow rate after the start of the operation is prevented from being significantly higher than the target flow rate to prevent progress of membrane fouling, thereby extending a filtration time.

DETAILED DESCRIPTION OF EMBODIMENTS OF THE INVENTION

Hereinafter, an embodiment of the present invention will be described in detail with reference to the drawings, but the present invention is not limited thereto.

Figure 1:
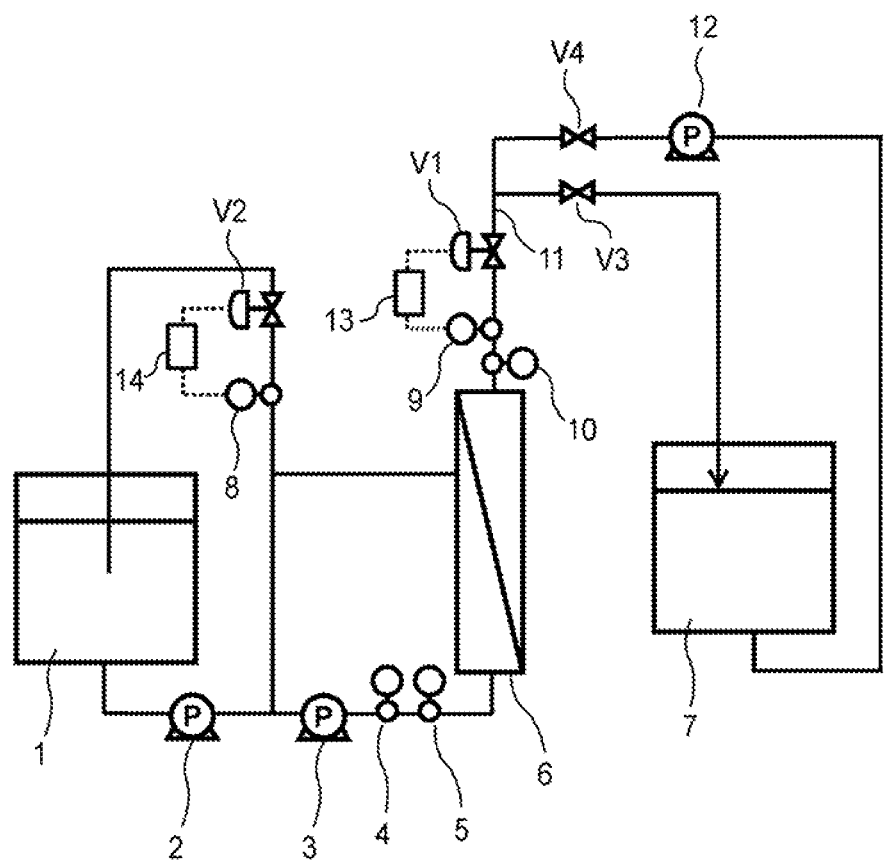
FIG. 1 is a schematic flow diagram showing an example of a filtration device of the present invention.

FIG. 1 is a schematic flow diagram showing an example of a filtration device of the present invention. The filtration device of this example includes a control valve V1 and a control valve V2 which serve as a flow rate control unit, an external pressure type hollow fiber membrane module (hereinafter referred to as "hollow fiber membrane module") 6 which serves as a separation membrane module, a flowmeter 9 and a flowmeter 8 which serve as a liquid flow rate detection unit, a computer 13 and a computer 14 which serve as an external control unit, and a pressure gauge 5 and a pressure gauge 10 which serve as a pressure detection unit. A difference between the pressure gauge 5 and the pressure gauge 10 is monitored as a transmembrane pressure.

Figure 2:
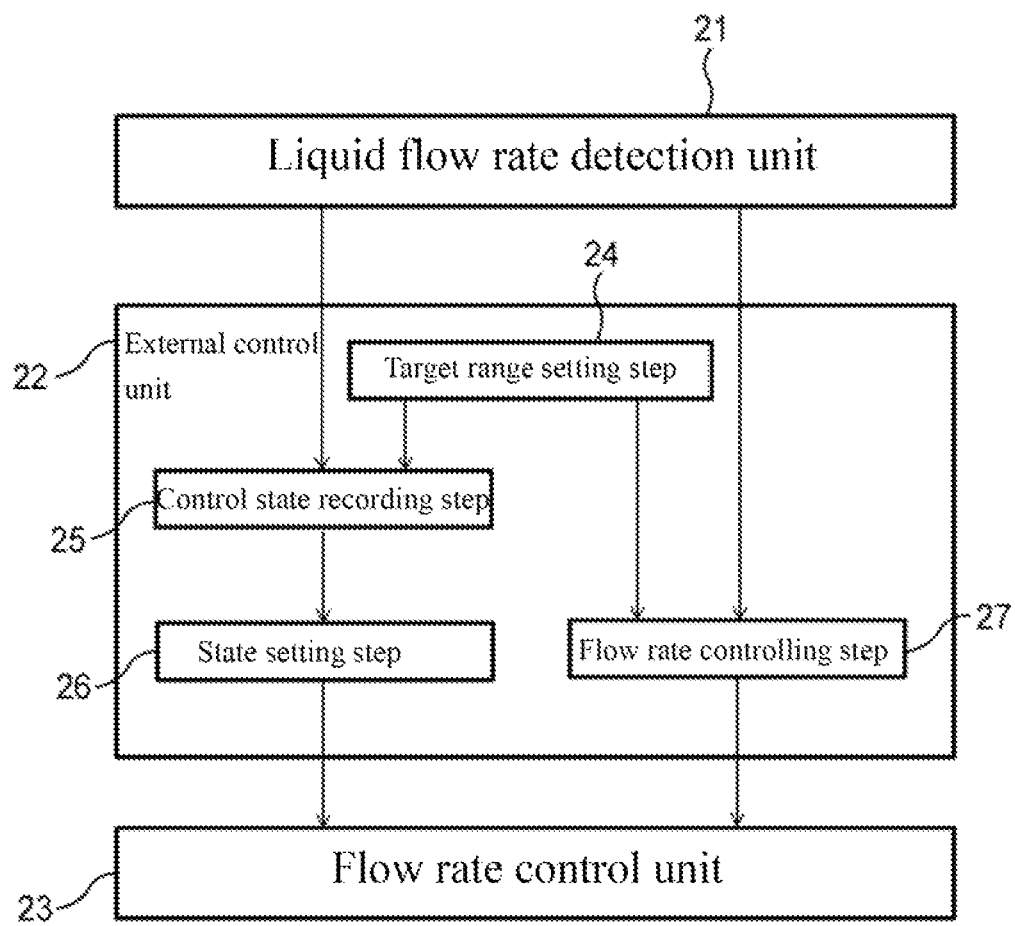
FIG. 2 is a schematic flowchart showing an example of an external control device of the present invention.

FIG. 2 is a schematic diagram showing signal flows of a fluid liquid amount detection unit, the external control unit, and the flow rate control unit. A liquid flow rate at a freely-selected part detected by a liquid flow rate detection unit 21 (corresponding to the flowmeter 9 and the flowmeter 8 in FIG. 1) is sent to an external control unit 22 (corresponding to the computer 13 and the computer 14 in FIG. 1). A calculation is performed in the external control unit 22, and a signal regarding a state of a flow rate control unit 23 (corresponding to the control valve V1 and the control valve V2 in FIG. 1) is sent to the flow rate control unit 23.

The external control unit 22 includes a target range setting step 24 of setting a target flow rate range A which includes a target liquid flow rate in the liquid flow rate detection unit 21, a control state recording step 25 of recording a state S of the flow rate control unit 23 when the liquid flow rate detected by the liquid flow rate detection unit 21 first enters within the target flow rate range A after a liquid to be filtered is started to be supplied to the hollow fiber membrane module 6, a state setting step 26 of setting the flow rate control unit 23 to the state S recorded in the control state recording step 25, and a flow rate controlling step 27 of controlling the state of the flow rate control unit 23 in accordance with the target liquid flow rate.

The authors have found that, by providing the external control unit 22 including the target range setting step 24, the control state recording step 25, the state setting step 26, and the flow rate controlling step 27, a time until the liquid flow rate is stabilized form starting the operation when a liquid to be filtered is filtered by the hollow fiber membrane module 6 in the filtration device of the present invention can be significantly shortened, while progress of membrane fouling caused by the fact that the liquid flow rate becomes higher than a target value immediately after the start of the operation can be prevented. Hereinafter, a specific operating method of the filtration device shown in FIGS. 1 and 2 will be described.

In the filtration device of the present invention, the liquid to be filtered, which is stored in a liquid-to-be-filtered tank 1 is supplied to the hollow fiber membrane module 6 by a supply pump 2. The liquid to be filtered is filtered by a hollow fiber membrane contained in the hollow fiber membrane module 6 from a hollow fiber membrane liquid-to-be-filtered side (primary side) to a hollow fiber membrane filtrate side (secondary side), and becomes a filtrate. The filtrate is sent to a filtrate storage tank 7 through a filtrate pipe 11 and stored therein.

A flow rate of the liquid to be filtered supplied to the hollow fiber membrane module 6 is monitored by the flowmeter 9. Valve opening degree of the control valve V1 which is a flow rate control device is controlled by the computer 13. A part of the liquid to be filtered is not filtered, and is then circulated by a circulation pump 3 and supplied to the hollow fiber membrane module 6 again.

After a filtration operation, in order to remove dirt accumulated on a surface of the hollow fiber membrane in the hollow fiber membrane module 6, a backflow washing operation of the hollow fiber membrane module 6 (hereinafter, referred to as a "backwashing operation") is performed. In the backwashing operation, a backwash liquid stored in the filtrate storage tank 7 is sent by a backwash pump 12 and supplied to the hollow fiber membrane module 6 through the filtrate pipe 11. The backwash liquid is caused to flow back from the hollow fiber membrane filtrate side (secondary side) to the hollow fiber membrane liquid-to-be-filtered side (primary side) of the hollow fiber membrane in the hollow fiber membrane module 6. A flow rate of the backwash liquid supplied to the hollow fiber membrane module 6 is monitored by the flowmeter 9. The valve opening degree of the control valve V1, which is the flow rate control unit, is controlled by the computer 13.

The filtration operation and the backwashing operation are repeatedly performed. The operating method of the filtration device of the present invention in the case of performing a plurality of cycles, where a series of flows in which one backwashing step is performed after one filtration step is referred to as one "cycle", will be described in detail below with an example.

As the freely-selected part in the filtration device, p1 (not shown), which is a flow rate measurement target part of the flowmeter 9, is selected. Then the target flow rate range A, which includes the target liquid flow rate is set at p1 in the target range setting step). After the target range setting step is performed, the filtration operation of the filtration device is started. The target range setting step may be performed after the filtration operation or the backwashing operation of the filtration device is started. Although a target flow rate range An for the filtration operation and a target flow rate range Ar for the backwashing operation are individually set in this example, values thereof may be common.

During the filtration operation of a first cycle, at the same time as the start of the operation, the liquid to be filtered is supplied to the hollow fiber membrane module 6 while the opening degree of the control valve V1 is controlled by the computer 13 based on the flow rate measured by the flowmeter 9 (liquid passing step P). A method of the control may be any method as long as the flow rate at the flowmeter 9 falls within the target liquid range An, and proportional-integral-differential (PID) control is preferable from the viewpoint of convergence to the target flow rate range An.

After starting the liquid passing step P, the liquid flow rate at p1 is monitored. Then a state Sn of the flow rate control unit (in this example, the opening degree of the control valve V1) is recorded in the computer 13 when the liquid flow rate at p1 first enters within the preset target flow rate range An (control state recording step). Here, the time when the liquid flow rate first enters within the target flow rate range An refers to a time point when the liquid flow rate continuously enters within the target flow rate range An for 1 second or more, preferably a time point when the liquid flow rate continuously enters within the range for 3 seconds or more, and more preferably a time point when the liquid flow rate continuously enters within the range for 5 seconds or more.

Various methods of recording the state Sn in the computer 13 are conceivable, and such a method is not particularly limited as long as the method is capable of recording information that is necessary and sufficient for returning the flow rate control unit to the state Sn again.

After the state Sn of the flow rate control unit is recorded in the control state recording step, the filtration operation is ended after a predetermined time. Thereafter, the backwashing operation of the first cycle is performed. During the backwashing operation of the first cycle as well, at the same time as the start of the operation, the filtrate is supplied to the hollow fiber membrane module 6 while the opening degree of the control valve V1 is controlled by the computer 13 based on the flow rate measured by the flowmeter 9 (liquid passing step P). In this case as well, the method of controlling the opening degree of the control valve V1 may be any method as long as the flow rate at the flowmeter 9 falls within the target flow rate range Ar, and it is preferable that the PID control is performed by the computer 13 from the viewpoint of convergence to the target flow rate range Ar.

After the liquid passing step P is started, the liquid flow rate at p1 is monitored. Then a state Sr of the flow rate control unit (in this example, the opening degree of the control valve V1) is recorded in the computer 13 when the liquid flow rate at p1 first enters within the target flow rate range Ar (control state recording step). Here, the time when the liquid flow rate first enters within the target flow rate range Ar refers to a time point when the liquid flow rate continuously enters within the target flow rate range A for 1 second or more, preferably a time point when the liquid flow rate continuously enters within the range for 3 seconds or more, and more preferably a time point when the liquid flow rate continuously enters within the range for 5 seconds or more. A method of recording the state Sr is also not particularly limited.

After the state Sr of the flow rate control unit is recorded in the control state recording step, the backwashing operation is ended after a predetermined time. Thereafter, the filtration operation of a second cycle is performed.

During the filtration operation of the second cycle, at the same time as the start of the supply of the liquid to be filtered to the hollow fiber membrane module 6, the control valve V1 which serves as the flow rate control unit is set to the state Sn, and the liquid to be filtered is supplied to the hollow fiber membrane module 6 (liquid passing step I).

After the liquid passing step I of the filtration operation of the second cycle is performed for a predetermined time, the supply of the liquid to be filtered to the hollow fiber membrane module 6 is switched to the PID control, and the filtration operation is continued (liquid passing step P).

In a series of flows for the filtration operation from the first cycle to the second cycle so far, the operating method of the filtration device of the present invention is executed for the filtration operation which includes (1) the target range setting step of setting the target flow rate range An, (2) the control state recording step of recording the state Sn of the flow rate control unit, (3) the liquid passing step I of setting the flow rate control unit to the state Sn, and (4) the liquid passing step P.

After a predetermined time, the filtration operation is ended, and the backwashing operation of the second cycle is performed. During the backwashing operation of the second cycle as well, at the same time as the start of the operation, the control valve V1 which serves as the flow rate control unit is set to the state Sr, and the backwashing liquid is supplied to the hollow fiber membrane module 6 (liquid passing step I). After the liquid passing step I of the backwashing operation of the second cycle is performed for a predetermined time, the supply of the backwashing liquid to the hollow fiber membrane module 6 is switched to the PID control, and the backwashing operation is continued (liquid passing step P).

In a series of flows for the backwashing operation from the first cycle to the second cycle so far, the operating method of the filtration device of the present invention is executed for the backwashing operation which includes (1) the target range setting step of setting the target flow rate range Ar, (2) the control state recording step of recording the state Sr of the flow rate control unit, and (3) the liquid passing step I and the liquid passing step P of setting the flow rate control unit to the state Sr.

As described above, after the supply of the liquid to be filtered or the backwash liquid to the separation membrane module is started, the state S of the flow rate control unit is recorded when the liquid flow rate at the freely-selected part in the filtration device first enters within the target flow rate range A, and is applied to the subsequent liquid passing step I, so that a rise control is facilitated at the start of the liquid passing step I, and the stable target liquid flow rate can be achieved at an earlier stage.

The operating method of the filtration device of the present invention achieves a particularly preferable effect in a flow of an aspect in which the supply of the liquid to be filtered or the backwash liquid is stopped after the control state recording step is finished and then the supply of the liquid to be filtered or the backwash liquid is started in the liquid passing step I.

On the other hand, in a case where the state S of the flow rate control unit is recorded after a certain period of time has elapsed since the liquid flow rate enters within the target flow rate range A and is then applied to the subsequent liquid passing step I, the rise control during the liquid passing step becomes difficult, and it takes a long time to achieve the stable target liquid flow rate. This is due to an influence of membrane fouling of the separation membrane or the like caused by the lapse of the certain period of time.

For example, during the control state recording step of the filtration operation, when the liquid flow rate at the freely-selected part enters within the target flow rate range A and then a certain time elapses, the membrane fouling of the separation membrane progresses, and the opening degree of the control valve V1 which is the flow rate control unit is increased so as to adjust the liquid flow rate in accordance with the membrane fouling.

Even if the opening degree of the control valve V1 in this situation is recorded as the state S, the state S is not suitable for the liquid passing step I in the subsequent filtration operation in a case where the membrane fouling of the separation membrane is eliminated in the subsequent backwashing operation. Since the opening degree of the control valve is excessively large, the liquid flow rate greatly exceeds the target flow rate range. As a result, it takes a long time to achieve the stable target liquid flow rate. Further, the excessive liquid flow rate results in a vicious cycle in which the membrane fouling of the separation membrane is more likely to progress.

Figure 3:
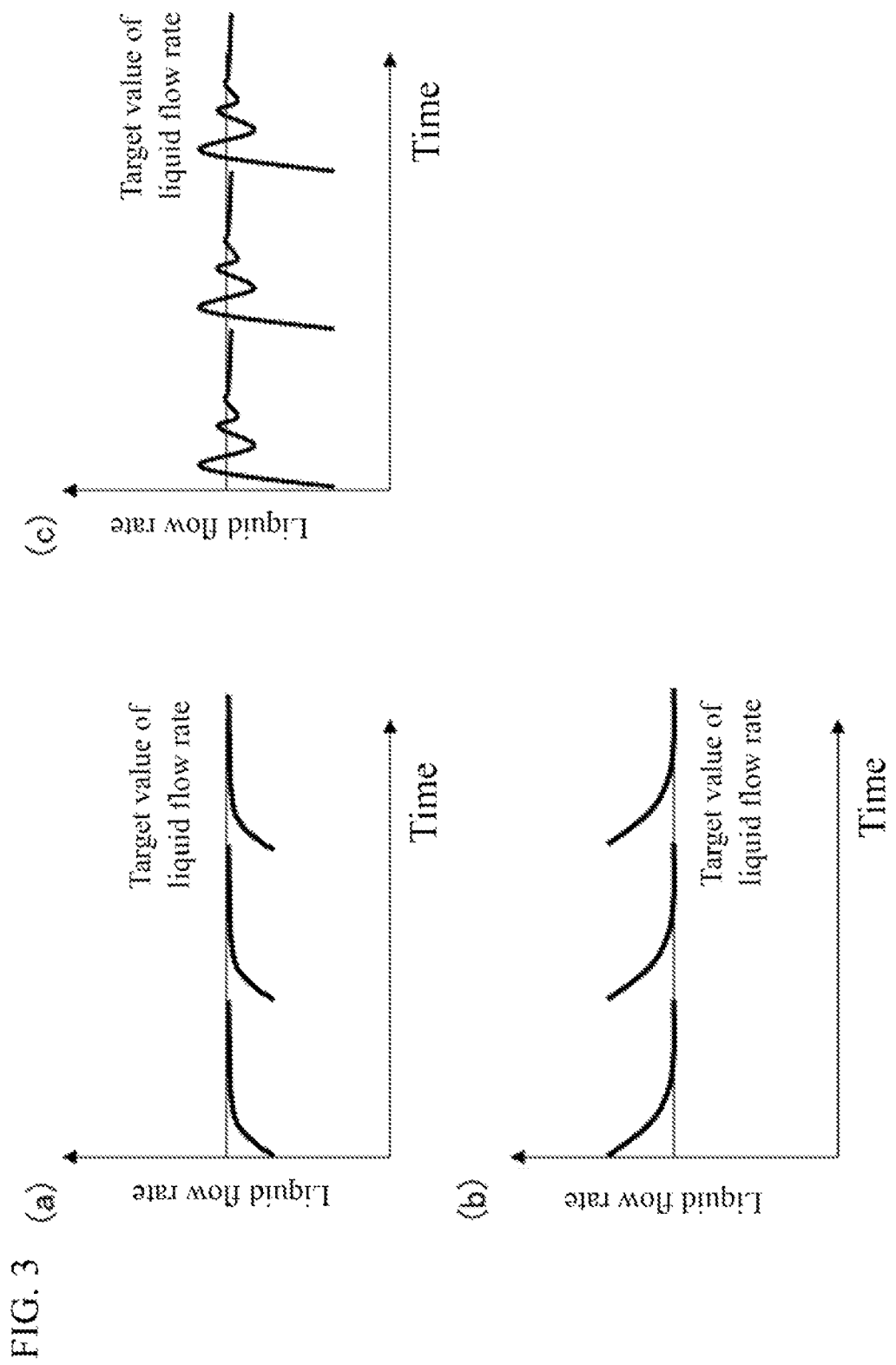
FIG. 3 is a schematic diagram showing an example of liquid flow rate transition of the present invention.

FIG. 3 schematically shows transition (a) of a filtration flow rate in the liquid passing step I of the present invention, transition (b) of a filtration flow rate in a case where a conventional technique is applied, and transition (c) of a filtration flow rate in a case where the PID control is performed from the start of the filtration operation without performing the liquid passing step I. By applying the liquid passing step I of the present invention, the target liquid flow rate can be reached early while the flow rate after the start of operation can be prevented from significantly increasing.

After the liquid passing step P of the second cycle is performed for a predetermined time period, the backwashing step may be ended, and the filtration operation and the backwashing operation of a third cycle and a fourth cycle may be performed in the same way. Moreover, the control state recording step may be performed during each of the filtration operation and the backwashing operation of the second cycle, the state Sn and the state Sr may be recorded again, and the filtration operation and the backwashing operation of the third cycle may be performed by applying these states.

When the filtration operation and the backwashing operation of an n-th cycle are performed in repetition of the cycles as described above, it is preferable to apply the state Sn and the state Sr recorded in the control state recording step performed in an immediately preceding cycle ((n-1)-th cycle) so as to perform the flow rate control with higher accuracy.

The opening degree of the n-th cycle may be set based on a tendency of several immediately preceding cycles (for example, several cycles from an (n-5)-th cycle to an (n-1)-th cycle). For example, when opening degrees from an opening degree Sn(n-5) of the (n-5)-th cycle to an opening degree Sn(n-1) of the (n-1)-th cycle of the control valve V1 are plotted relative to the number of cycles and an approximate straight line is drawn by a least-squares method, opening degree Sn(n) of the n-th cycle may be calculated based on the approximate straight line and set to be Sn. In this case, Sn is preferably predicted based on three or more immediately preceding cycles.

Such a method is effective, for example, in a case where properties of the liquid to be filtered are rapidly deteriorated or improved while the operation is continued. In particular, in a case where the properties of the liquid to be filtered are improved, the method effectively prevents the operation from being performed at a flow rate higher than a target value.

The term "freely-selected part" selected in the target range setting step is not limited to one part in the filtration device, and a plurality of "freely-selected parts" may be selected. When a plurality of "freely-selected parts" are selected, it is necessary to associate each of the part with a corresponding flow rate control unit. On the other hand, even if the "freely-selected part" is one part, the state S of a plurality of the flow rate control units may be recorded in the control state recording step.

For example, in the filtration device shown in FIG. 1, in addition to the control valve V1, the control valve V2, the supply pump 2, the circulation pump 3, or the backwash pump 12 may also be used as the flow rate control unit, and opening degree of the control valve V2 and outputs of the backwash pump 12, the supply pump 2, and the circulation pump 3 may also be recorded in the control state recording step as the state S. In the case of the control valve V2, the opening degree is controlled by the computer 14 based on a liquid flow rate detected by the flowmeter 8.

In the operating method of the filtration device of the present invention, the liquid passing step I of maintaining the state S is preferably continued for 5 seconds or more, and more preferably continued for 10 seconds or more. By continuing the liquid passing step I for 5 seconds or more, the rise control at the start of the liquid passing step I is facilitated. Meanwhile, in order to perform the liquid passing step P at an earlier stage, the liquid passing step I is preferably performed for 60 seconds or less, more preferably 30 seconds or less, and still more preferably 20 seconds or less.

The target flow rate range A in the target range setting step included in the operating method of the filtration device of the present invention is preferably within ±20% with respect to the target liquid flow rate, more preferably within ±10%, and still more preferably within ±5%. Meanwhile, since it takes a long time before the flow rate first enters within the target flow rate range A if the target flow rate range A is too narrow, it is preferable that the target flow rate range A is ±1% or more. By setting such a range, the rise control at the start of the liquid passing step I is further facilitated, and the stable target liquid flow rate can be achieved at an earlier stage.

The flow rate control unit included in the filtration device to which the operating method of the filtration device of the present invention is applied is preferably a valve and/or a pump capable of performing flow rate control more easily with high accuracy.

The separation membrane module included in the filtration device to which the operating method of the filtration device of the present invention is applied is not particularly limited, and any known configuration can be applied thereto.

The separation membrane included in the separation membrane module may be an organic membrane or an inorganic membrane as long as the membrane enables the backwashing, and examples thereof include organic membranes made of polyvinylidene fluoride, polysulfone, polyethersulfone, polytetrafluoroethylene, polyethylene or polypropylene, and inorganic membranes made of ceramics. A separation membrane made of polyvinylidene fluoride is preferable since such a separation membrane is less likely to be contaminated by organic substances, is easy to clean, and has excellent durability.

Examples of a type of the separation membrane include a microfiltration membrane or an ultrafiltration membrane having an average pore diameter of 0.001 μm or more and less than 10 μm. Examples of a shape of the separation membrane include a hollow fiber membrane, a tubular membrane, a monolith membrane, and a pleated membrane. A hollow fiber membrane having a larger membrane surface area with respect to a volume of the separation membrane module is preferable.

The hollow fiber membrane may be an external pressure type hollow fiber membrane that performs the filtration from an outer side to an inner side of hollow fibers or an internal pressure type hollow fiber membrane that performs the filtration from the inner side to the outer side. The external pressure type hollow fiber membrane is preferable since such an external pressure type hollow fiber membrane is less likely to suffer from fouling due to turbidity matter. The external pressure type hollow fiber membrane preferably has an outer diameter of 0.5 to 3 mm. When the outer diameter is 0.5 mm or more, resistance of the filtrate flowing in the hollow fiber membrane can be controlled to be relatively small. Meanwhile, when the outer diameter is 3 mm or less, collapse of the hollow fiber membrane caused by pressure of the liquid to be filtered can be prevented. The internal pressure type hollow fiber membrane preferably has an inner diameter of 0.5 to 3 mm. When the inner diameter is 0.5 mm or more, the resistance of the liquid to be filtered flowing in the hollow fiber membrane can be controlled to be relatively small. On the other hand, when the inner diameter is 3 mm or less, a larger membrane surface area can be ensured.

A mode of the filtration using the separation membrane module whose separation membrane is the hollow fiber membrane may be dead-end filtration or cross-flow filtration. However, since an amount of dirt to be adhered to the separation membrane is large in a liquid to be filtered containing a high concentration of an organic substance, cross-flow filtration, in which a shearing force of the circulating liquid to be filtered is obtained, is preferable in order to effectively remove the dirt.

The filtration device and the operating method of the filtration device of the present invention are suitably used for filtration of a liquid to be filtered which has a high rate of increase in the transmembrane pressure during one cycle. Specifically, the rate of increase in the transmembrane pressure during one cycle is 1 kPa/min or more, preferably 1.5 kPa/min or more, and more preferably 2 kPa/min or more. During the filtration of the liquid to be filtered having a rate of increase of 1 kPa/min or more, the membrane fouling of the separation membrane progresses rapidly, and thus the effect of the present invention becomes remarkable.

Examples of the liquid to be filtered, which has a high rate of increase in the transmembrane pressure in one cycle, include a liquid having a turbidity of 20 NTU or more and a liquid having a total organic carbon (TOC) of 10 mg/L or more. Specific examples thereof include highly turbid surface water, secondary treated water of sewage, factory waste water, and biological fermentation liquid.

EXAMPLE

Preparation of Polyvinylidene Fluoride Microfiltration Hollow Fiber Membrane 38 parts by mass of a vinylidene fluoride homopolymer having a weight average molecular weight of $41.7 \times 10^4$ and 62 parts by mass of γ-butyrolactone were mixed and dissolved at 160° C. The polymer solution was discharged from a spinneret of a double tube while being accompanied with an aqueous solution of 85% by mass of γ-butyrolactone, which serves as a liquid for forming a hollow portion, and coagulated in a cooling bath formed of an aqueous solution of 85% by mass of γ-butyrolactone at a temperature of 5° C. placed at 30 mm below from the spinneret so as to prepare a polyvinylidene fluoride (hereinafter, referred to as PVDF) microfiltration hollow fiber membrane. The obtained PVDF hollow fiber membrane had an outer diameter of 1250 μm, an inner diameter of 800 μm, and an average pore diameter of 0.3 μm.

Preparation of External Pressure Type PVDF Microfiltration Hollow Fiber Membrane Module One hundred hollow fiber membranes obtained thus were filled in a polysulfone cylindrical case having an inner diameter of 22 mm and a length of 300 mm, and a mixture including a bisphenol F-type epoxy resin (LST868-R14, manufactured by Huntsman Corporation) and an aliphatic amine-based curing agent (LST868-H14, manufactured by Huntsman Corporation) with a mass ratio of 100:30 was poured into one end portion of the case and cured to form a potting part. A potting part was also formed at the other end of the case in the same way, and the potting parts were cut at two ends to open the hollow portion of the hollow fiber membrane, thereby preparing an external pressure type PVDF microfiltration hollow fiber membrane module.

Example 1

The prepared external pressure type PVDF microfiltration hollow fiber membrane module was used as the separation membrane module to constitute the filtration device shown in FIG. 1.

In this filtration device, a cycle of a cross-flow filtration operation and a backwashing operation was repeated. More specifically, the cross-flow filtration operation was performed for 550 seconds with a target filtration flux of 2.2 m³/m²/day using a commercially available unfiltered wine as the liquid to be filtered, and the backwashing operation was performed with a target backwash flux of 3.0 m³/m²/day using a filtrate of the filtration operation as the backwash liquid. Membrane surface linear velocity during the cross-flow filtration operation was set to 1.5 m/s.

Before performing the filtration operation of the first cycle, p1, which is the flow rate measurement target part of the flowmeter 9, was selected as the freely-selected part in the filtration device, and a range of ±10% with respect to the target filtration flux of 2.2 m³/m²/day including the target filtration flux of 2.2 m³/m²/day, which is the target liquid flow rate, was set as the target flow rate range A (target range setting step).

During the filtration operation of the first cycle, after the supply of the liquid to be filtered to the separation membrane module was started by the PID control, the valve opening degree of the control valve V1 was recorded as the state S when a liquid flow rate (filtration flux) at p1 entered within the range of ±10% with respect to 2.2 m³/m²/day which is the target flow rate range A (60 seconds after the start of the filtration operation) (control state recording step).

During the filtration operation of the second cycle, the valve opening degree of the control valve V1 was set to the state S recorded during the filtration operation of the first cycle, the liquid to be filtered was supplied to the separation membrane module for 5 seconds (liquid passing step I), and then the liquid to be filtered was supplied by the PID control (liquid passing step P). A time from the start of the filtration operation of the second cycle until the liquid flow rate at p1 first entered within the target flow rate range A was 20 seconds, and the liquid flow rate could thus be stabilized at an early stage. The transition of the liquid flow rate was as shown in (a) of FIG. 3, in which the liquid flow rate did not become significantly higher than the target liquid flow rate.

Example 2

The filtration device was operated in the same manner as in Example 1 except that the time period of the liquid passing step I was changed to 10 seconds. The time from the start of the filtration operation of the second cycle until the liquid flow rate at p1 first entered within the target flow rate range A was 15 seconds, and the liquid flow rate could thus be stabilized at an early stage. The transition of the liquid flow rate was as shown in (a) of FIG. 3, in which the liquid flow rate did not become significantly higher than the target liquid flow rate.

Example 3

The filtration device was operated in the same manner as in Example 1 except that the time period of the liquid passing step I was changed to 15 seconds. The time from the start of the filtration operation of the second cycle until the liquid flow rate at p1 first entered within the target flow rate range A was 20 seconds, and the liquid flow rate could thus be stabilized at an early stage. The transition of the liquid flow rate was as shown in (a) of FIG. 3, in which the liquid flow rate did not become significantly higher than the target liquid flow rate.

Example 4

The filtration device was operated in the same manner as in Example 1 except that the time period of the liquid passing step I was changed to 20 seconds. The time from the start of the filtration operation of the second cycle until the liquid flow rate at p1 first entered within the target flow rate range A was 25 seconds, and the liquid flow rate could thus be stabilized. The transition of the liquid flow rate was as shown in (a) of FIG. 3, in which the liquid flow rate did not become significantly higher than the target liquid flow rate.

Comparative Example 1

The filtration device was operated in the same manner as in Example 1 except that the liquid to be filtered was supplied by the PID control from the start of the filtration operation without performing the liquid passing step I during the filtration operation of the second cycle. The time from the start of the filtration operation of the second cycle until the liquid flow rate at p1 first entered within the target flow rate range A was 60 seconds, and thus the liquid flow rate could not be stabilized at an early stage. The transition of the liquid flow rate was as shown in (c) of FIG. 3, and there was a case where the filtration flow rate at the start of the filtration of the second cycle was significantly higher than the target liquid flow rate.

Comparative Example 2

The filtration device was operated in the same manner as in Example 1 except that the valve opening degree of the control valve V1 was recorded when 545 seconds has elapsed after the start of the filtration operation during the filtration operation of the first cycle, and the time period of the liquid passing step I was changed to 10 seconds during the filtration operation of the second cycle. During the filtration operation of the first cycle, the liquid flow rate (filtration flux) at p1 entered within the range of ±10% with respect to 2.2 $m^3/m^2$/day which is the target flow rate range A after 60 seconds from the start of the filtration operation as in Example 1. However, as compared with that time, fouling of the separation membrane considerably progressed after the lapse of 545 seconds since the start of the filtration operation, and the valve opening degree of the control valve V1 was large. As a result, since the valve opening degree of the control valve V1 at the start of the filtration operation of the second cycle was excessively large, the transition of the liquid flow rate at p1 from the start of the filtration operation was as shown in (b) of FIG. 3, in which the flow rate was significantly exceeded the target flow rate range A, then it took 55 seconds to enter within the target flow rate range A again, and thus the liquid flow rate could not be stabilized at an early stage.

Although the present invention has been described in detail with reference to a specific embodiment, it will be apparent to those skilled in the art that various changes and modifications can be made without departing from the spirit and scope of the invention.

The present application is based on Japanese Patent Application No. 2018-242780 filed on Dec. 26, 2018, and the contents thereof are incorporated herein as reference.

INDUSTRIAL APPLICABILITY

The filtration device and the operating method thereof of the present invention are preferably applied to filtration treatment of a liquid to be filtered in various fields, for example, water treatment fields such as drinking water production, water purification treatment, and wastewater treatment, fermentation fields involving culturing of microorganisms and cultured cells, and food industry fields.

REFERENCE SIGNS LIST 1 liquid-to-be-filtered tank
2 supply pump
3 circulation pump
4 flowmeter
5 pressure gauge
6 hollow fiber membrane module
7 filtrate storage tank
8 flowmeter
9 flowmeter
10 pressure gauge
11 filtrate pipe
12 backwash pump
13 computer
14 computer
V1 control valve
V2 control valve
V3 valve
V4 valve
21 liquid flow rate detection unit
22 external control unit
23 flow rate control unit
24 target range setting step
25 control state recording step
26 state setting step
27 flow rate controlling step

The invention claimed is:
1. A filtration device comprising:
a flow rate control unit;
a separation membrane module;

a liquid flow rate detection unit capable of detecting a liquid flow rate of the filtration device at a selected part(s) of the filtration device; and an external control unit controlling a state of the flow rate control unit, and repeating a filtration cycle comprising at least a filtration operation and a backwashing operation several times, wherein the external control unit performs:

a target range setting step of setting a target flow rate range A which includes a target liquid flow rate at the selected part(s) of the filtration device;

a control state recording step of recording a state S of the flow rate control unit when the liquid flow rate at the selected part(s) of the filtration device first enters within the target flow rate range A in the beginning of the filtration operation or the backwashing operation after a liquid to be filtered or a backwash liquid under control of the flow rate control unit is supplied to the separation membrane module in each filtration cycle;

a state setting step of setting the flow rate control unit to the state S recorded in the control state recording step; and a flow rate controlling step of controlling the liquid flow rate to be within the target flow rate range A, wherein the filtration operation and/or the backwashing operation comprises:

a liquid passing step I of setting the flow rate control unit to the state S recorded in the control state recording step, and supplying the liquid to be filtered or the backwash liquid to the separation membrane module; and a liquid passing step P of controlling a flow rate, at which the liquid to be filtered or the backwash liquid is supplied to the separation membrane module, to be within the target flow rate range A by the flow rate control unit, wherein the flow rate control unit in the liquid passing step I in n-th filtration cycle (n is a natural number being 2 or more) is set to a state recorded in (n-1)-th filtration cycle by the flow rate control unit.

2. The filtration device according to claim 1, wherein the target flow rate range A is within ±10% with respect to the target liquid flow rate.

3. The filtration device according to claim 1, wherein the flow rate control unit is a valve and/or a pump.

4. A method of operating a filtration device, the filtration device comprising:

a flow rate control unit;

a separation membrane module;

a liquid flow rate detection unit detecting a liquid flow rate of the filtration device at a selected part(s) of the filtration device; and an external control unit controlling a state of the flow rate control unit, and repeating a filtration cycle comprising at least a filtration operation and a backwashing operation several times, wherein the external control unit performs:

a target range setting step of setting a target flow rate range A which includes a target liquid flow rate at the selected part(s) of the filtration device;

a control state recording step of recording a state S of the flow rate control unit when the liquid flow rate at the selected part(s) of the filtration device first enters within the target flow rate range A in the beginning of the filtration operation or the backwashing operation after a liquid to be filtered or a backwash liquid under control of the flow rate control unit is supplied to the separation membrane module in each filtration cycle;

a state setting step of setting the flow rate control unit to the state S recorded in the control state recording step; and a flow rate controlling step of controlling the liquid flow rate to be within the target flow rate range A, wherein the filtration operation and/or the backwashing operation comprises:

a liquid passing step I of setting the flow rate control unit to the state S recorded in the control state recording step, and supplying the liquid to be filtered or the backwash liquid to the separation membrane module; and a liquid passing step P of controlling a flow rate, at which the liquid to be filtered or the backwash liquid is supplied to the separation membrane module, to be within the target flow rate range A by the flow rate control unit, the method comprising setting the flow rate control unit in the liquid passing step I in n-th filtration cycle (n is a natural number being 2 or more) to a state recorded in (n-1)-th filtration cycle by the flow rate control unit.

5. The method of operating a filtration device according to claim 4, wherein the supply of the liquid to be filtered or the backwash liquid is stopped after the control state recording step is finished, and the supply of the liquid to be filtered or the backwash liquid is started in the liquid passing step I.

6. The method of operating a filtration device according to claim 4, wherein the liquid passing step I is continued for 5 seconds or more.

7. The method of operating a filtration device according to claim 4, wherein the target flow rate range A is within ±10% with respect to the target liquid flow rate.

8. The method of operating a filtration device according to claim 4, wherein the flow rate control unit is a valve and/or a pump.

9. The method of operating a filtration device according to claim 4, wherein the liquid to be filtered has a turbidity of 20 NTU or more.

10. The method of operating a filtration device according to claim 4, wherein the liquid to be filtered has a rate of increase in a transmembrane pressure in the filtration operation of 1 kPa/min or more.

* * * * *